United States Patent
Chen (10) Patent No.: US 10,198,004 B2
(45) Date of Patent: Feb. 5, 2019

(54) METHOD AND APPARATUS FOR OBTAINING RANGE IMAGE WITH UAV, AND UAV

(71) Applicant: GUANGZHOU XAIRCRAFT TECHNOLOGY CO., LTD., Guangdong (CN)

(72) Inventor: Yousheng Chen, Guangdong (CN)

(73) Assignee: GUANGZHOU XAIRCRAFT TECHNOLOGY CO., LTD., Guangzhou, Guangdong (CN)

( * ) Notice: Subject to any disclaimer, the term of this patent is extended or adjusted under 35 U.S.C. 154(b) by 0 days.

(21) Appl. No.: 15/565,582

(22) PCT Filed: Sep. 23, 2016

(86) PCT No.: PCT/CN2016/099925
§ 371 (c)(1),
(2) Date: Oct. 10, 2017

(87) PCT Pub. No.: WO2017/050279
PCT Pub. Date: Mar. 30, 2017

(65) Prior Publication Data
US 2018/0120847 A1    May 3, 2018

(30) Foreign Application Priority Data
Sep. 25, 2015 (CN) .......................... 2015 1 0628505

(51) Int. Cl.
*G05D 1/00*    (2006.01)
*G06T 7/00*    (2017.01)
(Continued)

(52) U.S. Cl.
CPC ......... *G05D 1/0094* (2013.01); *B64C 39/024* (2013.01); *G01C 21/165* (2013.01);
(Continued)

(58) Field of Classification Search
CPC .. G05D 1/0094; G08G 5/0069; B64C 39/024; B64C 2201/127; G01C 21/165; G06K 9/0063
See application file for complete search history.

(56) References Cited

U.S. PATENT DOCUMENTS

2009/0201380 A1* 8/2009 Peaslee .................... G06T 7/20
348/208.4
2010/0295855 A1   11/2010 Sasakawa et al.
(Continued)

FOREIGN PATENT DOCUMENTS

CN      202075794 U    12/2011
CN      102749071 A    10/2012
(Continued)

OTHER PUBLICATIONS

English translation of the International Search Report dated Nov. 25, 2016 for corresponding International Application No. PCT/CN2016/099925, filed Sep. 23, 2016.
(Continued)

*Primary Examiner* — Rodney A Butler
(74) *Attorney, Agent, or Firm* — David D. Brush; Westman, Champlin & Koehler, P.A.

(57) ABSTRACT

A method and an apparatus for obtaining a range image, and a UAV are provided. The method includes: reading an image sequence of a predetermined scene, in which the $N^{th}$ image and the $(N+1)^{th}$ image of the image sequence have an overlapping region; obtaining a pixel movement velocity of each pixel point in the overlapped region in a camera coordinate system of the UAV; obtaining an actual flying velocity of the UAV in a world coordinate system; obtaining a range image of each overlapped region according to the pixel movement velocity of each pixel point in the overlapped region in the camera coordinate system of the UAV, the actual flying velocity of the UAV in the word coordinate
(Continued)

system, and parameters of the airborne camera, and obtaining a range image of the preset scene through integrating the range image of each overlapped region.

20 Claims, 2 Drawing Sheets

(51) Int. Cl.
  *B64C 39/02* (2006.01)
  *G06K 9/00* (2006.01)
  *G01C 21/16* (2006.01)
  *G08G 5/00* (2006.01)
  *G06T 7/579* (2017.01)
(52) U.S. Cl.
  CPC ............. *G06K 9/0063* (2013.01); *G06T 7/00* (2013.01); *G06T 7/579* (2017.01); *G08G 5/0069* (2013.01); *B64C 2201/127* (2013.01)

(56) References Cited

U.S. PATENT DOCUMENTS

| 2014/0192193 | A1* | 7/2014 | Zufferey | G05D 1/0094 |
| | | | | 348/144 |
| 2015/0022656 | A1 | 1/2015 | Carr et al. | |

FOREIGN PATENT DOCUMENTS

| CN | 103426200 | A | 12/2013 |
| CN | 105225241 | A | 1/2016 |
| EP | 2849150 | A1 | 3/2015 |
| JP | H03113305 | A | 5/1991 |

OTHER PUBLICATIONS

English translation of the Written Opinion of the International Searching Authority dated Dec. 19, 2016, for corresponding International Application No. PCT/CN2016/099925, filed Sep. 23, 2016.
Lee, D. et al., "Depth Estimation for Image-Based Visual Servoing of an Under-Actuated System", Journal of Institute of Control, Robotics and Systems, vol. 18, No. 1, Dec. 31, 2012 (Dec. 31, 2012), ISSN: 1976-5622, pp. 42-46.
English translation of Office Action dated Mar. 30, 2018, from KIPO for KR application 20177034364.
Office action from EPO dated May 17, 2018, for EP application 16848160.
Madjidi H et al., "Vision-based positioning and terrain mapping by global alignment for UAVs", Advanced Video and Signal Based Surveillance, pp. 305-312, XP010648399, published on Jul. 21, 2003, cited in office action from EPO for EP application 16848160.
English translation of the Japanese Office Action dated Aug. 10, 2018, for corresponding Japanese Application No. 2017/566134.

* cited by examiner

METHOD AND APPARATUS FOR OBTAINING RANGE IMAGE WITH UAV, AND UAV

CROSS-REFERENCE TO RELATED APPLICATIONS

This application is a U.S. national phase of International Application PCT/CN2016/099925, filed Sep. 23, 2016 and published as WO 2017/050279 on Mar. 30, 2017, not in English, which is based on and claims priority to Chinese Patent Application No. 201510628505.7, filed on Sep. 25, 2015, the entire contents of which are incorporated herein by reference.

FIELD

The present disclosure relates to the technical field of image processing, and more particularly, to a method and an apparatus for obtaining a range image with an unmanned aerial vehicle (UAV), and an unmanned aerial vehicle.

BACKGROUND

In conventional imaging ways, a three-dimensional image model is converted into a two-dimensional gray-scale image and depth information of the image is lost during the imaging process. However, the depth information of the image is very important for subsequent applications (such as a 3D reconstruction, a geography mapping, etc.), so that it is significant to obtain a range image (or a depth map) for both theoretical research and engineering practice.

SUMMARY

Embodiments of the present disclosure provide a method for obtaining a range image with a UAV, including: reading an image sequence of a predetermined scene collected by an airborne camera of the UAV, in which the $N^{th}$ image and the $(N+1)^{th}$ image of the image sequence have an overlapping region, and a ratio of an area of the overlapping region to an area of the $N^{th}$ image or a ratio of the area of the overlapping region to an area of the $(N+1)^{th}$ image is greater than a preset ratio; for each pixel point in the overlapped region, obtaining position changing information of the pixel point in the $(N+1)^{th}$ image with respect to the $N^{th}$ image and obtaining a pixel movement velocity of each pixel point in the overlapped region in a camera coordinate system of the UAV according to the position changing information; obtaining an actual flying velocity of the UAV in a world coordinate system; obtaining a range image of each overlapped region according to the pixel movement velocity of each pixel point in the overlapping region in the camera coordinate system of the UAV, the actual flying velocity of the UAV in the word coordinate system, and parameters of the airborne camera, and obtaining a range image of the preset scene through integrating the range image of each overlapped region.

Embodiments of the present disclosure provide an apparatus for obtaining a range image with a UAV, including: a reading module, configured to read an image sequence of a predetermined scene collected by an airborne camera of the UAV, in which the $N^{th}$ image and the $(N+1)^{th}$ image of the image sequence have an overlapping region, and a ratio of an area of the overlapping region to an area of the $N^{th}$ image or a ratio of the area of the overlapping region to an area of the $(N+1)^{th}$ image is greater than a preset ratio; a calculation module, configured to obtain, for each pixel point in the overlapped region, position changing information of the pixel point in the $(N+1)^{th}$ image with respect to the $N^{th}$ image and to obtain a pixel movement velocity of each pixel point in the overlapped region in a camera coordinate system of the UAV according to the position changing information; a measurement module, configured to obtain an actual flying velocity of the UAV in a world coordinate system; and an image generating module, configured to obtain a range image of each overlapped region according to the pixel movement velocity of each pixel point in the overlapped region in the camera coordinate system of the UAV, the actual flying velocity of the UAV in the word coordinate system, and parameters of the airborne camera and to obtain a range image of the preset scene through integrating the range image of each overlapped region.

Embodiments of the present disclosure provide a UAV, including: an airborne camera, configured to collect an image sequence of a preset scene; a velocity measurement device, configured to measure or calculate an actual flying velocity of the UAV in a world coordinate system; a processor, configured to perform the above method for obtaining a range image with a UAV; an airframe, configured to install the airborne camera, the velocity measurement device and the processor.

Additional aspects and advantages of embodiments of the present disclosure will be given in part in the following descriptions, become apparent in part from the following descriptions, or be learned from practice of embodiments of the present disclosure.

BRIEF DESCRIPTION OF THE DRAWINGS

The above and/or other aspects and advantages of the present disclosure will become apparent and more readily appreciated from the following descriptions of the embodiments with reference to the drawings, in which.

DETAILED DESCRIPTION

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A method for obtaining a range image with an unmanned aerial vehicle (UAV) and a UAV according to embodiments of the present disclosure will be described with reference to accompanying drawings as follows.

Figure 1:
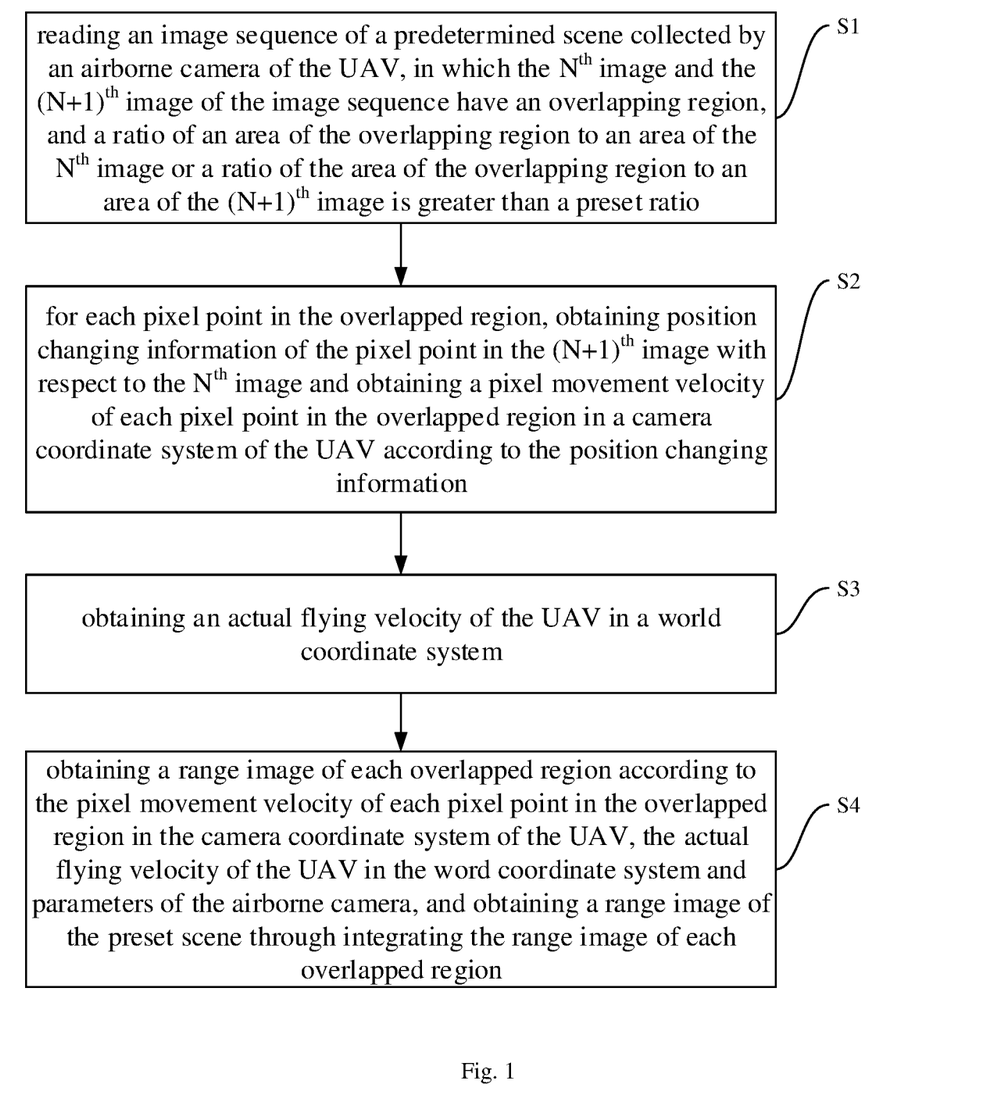
FIG. 1 is a flow chart illustrating a method for obtaining a range image with a UAV according to an embodiment of the present disclosure.

FIG. 1 is a flow chart illustrating a method for obtaining a range image with a UAV according to an embodiment of the present disclosure. As illustrated in FIG. 1, the method may include followings.

At block S1, an image sequence of a predetermined scene collected by an airborne camera of the UAV is read out, in which the $N^{th}$ image and the $(N+1)^{th}$ image of the image sequence have an overlapping region, and a ratio of an area of the overlapping region to an area of the $N^{th}$ image or a ratio of the area of the overlapping region to an area of the $(N+1)^{th}$ image is greater than a preset ratio. In other words, the image sequence of an object to be measured captured or taken by the airborne camera of the UAV is read out and two continuous images are extracted therefrom, for example, the $N^{th}$ image and the $(N+1)^{th}$ image. Besides, the $N^{th}$ image and the $(N+1)^{th}$ image must have the overlap region. To insure accuracy of a following optical flow calculation, the ratio of the area of the overlapping region to the area of the $N^{th}$ image or the $(N+1)^{th}$ image needs to be greater than the preset ratio. In an embodiment of the present disclosure, for example, the preset ratio is 60%, that is, the area of the overlapping region accounts for more than 60% of the area of the $N^{th}$ image or the $(N+1)^{th}$ image.

Figure 2:
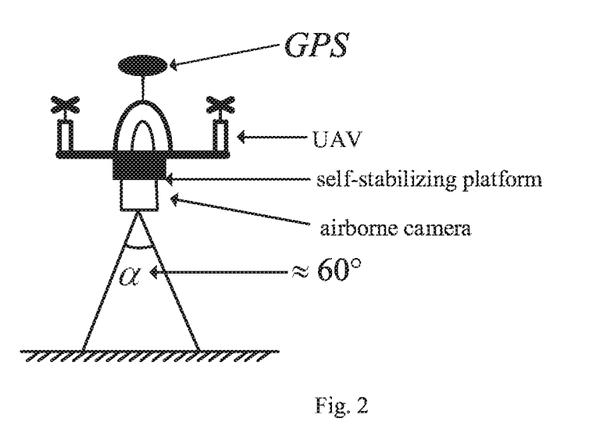
FIG. 2 is a schematic diagram illustrating a model for obtaining a range image with a UAV according to an embodiment of the present disclosure.

In addition, in an embodiment of the present disclosure, the airborne camera may be installed onto the UAV through a self-stabilizing platform, for example, as illustrated in FIG. 2. Meanwhile, to reduce influence of distortion of the image itself taken by the camera, a visual angle of the airborne camera cannot be too large. In an example of the present disclosure, the visual angle of the airborne camera is selected to be less than a preset angle. More particularly, for example, the preset angle may be 60 degree, as illustrated in FIG. 2. Obviously, the preset angle is not limited to the above angle and may be selected according to requirements of an actual scene (for example, the preset angle may be less than 60 degree), and this embodiment is just illustrated as an example.

In some embodiments, as mentioned above, when the distortion of the image taken by the airborne camera is serious, the distortion of images in the image sequence must be adjusted so as to make the distortion in a tolerable range for following operations.

At block S2, for each pixel point in the overlapped region, position changing information of the pixel point in the $(N+1)^{th}$ image with respect to the $N^{th}$ image is obtained, and a pixel movement velocity of each pixel point in the overlapped region in a camera coordinate system of the UAV is obtained according to the position changing information.

In some examples, for example, the change of the position information (i.e. the position changing information) of each pixel point in the overlapped region in the $(N+1)^{th}$ image with respect to the $N^{th}$ image may be obtained by an optical flow method based on feature matching, and the pixel movement velocity of each pixel point in the overlapped region in the camera coordinate system of the UAV may be obtained according to the change of the position information.

In an embodiment of the present disclosure, block S2 may further include followings.

At block S21, a moving distance of each pixel point in the overlapped region in the camera coordinate system of the UAV is calculated. In detail, in some examples, the moving distance of each pixel point in the overlapped region in the camera coordinate system of the UAV may be calculated by the optical flow method based on feature matching.

In an embodiment of the present disclosure, calculating the moving distance of each pixel point in the overlapped region in the camera coordinate system of the UAV may include: calculating moving information of a same pixel point based on position information of the same pixel point in the $N^{th}$ image and the $(N+1)^{th}$ image and obtaining a moving distance of the same pixel point in the camera coordinate system according to the moving information. As a particular example, the moving distance of each pixel point in the overlapped region in the camera coordinate system of the UAV may be calculated via an equation of $$(u_x, u_y) = (x_2 - x_1, y_2 - y_1),$$

where, $(x_1, y_1)$ represents the position information of the pixel point in the $N^{th}$ image, $(x_2, y_2)$ represents the position information of the pixel point in the $(N+1)^{th}$ image, and $(u_x, u_y)$ represents the moving distance of the pixel point in the camera coordinate system.

At block S22, a derivative of the moving distance of each pixel point in the overlapped region in the camera coordinate system of the UAV with respect to time is found so as to obtain the pixel movement velocity of each pixel point in the overlapped region in the camera coordinate system of the UAV.

In other words, for a particular example, with the optical flow method based on feature matching, a position in the $(N+1)^{th}$ image for each pixel point in the $N^{th}$ image is matched, then the moving distance of each pixel point in the $N^{th}$ image to the $(N+1)^{th}$ image may be calculated, and the pixel movement velocity of each pixel point in the camera coordinate system of the UAV may be obtained based on the moving distance. In detail, the optical flow method based on feature matching may include a dense algorithm and a sparse algorithm. With the dense algorithm, all pixel points in an image are participated in calculation, so as to obtain the pixel movement velocity of each pixel point in the image. While with the sparse algorithm, parts of pixel points in the image which are easy to track may be selected, and optical flow calculation is performed to the selected pixel points so as to obtain pixel movement velocities of these pixel points easy to track. In an embodiment of the present disclosure, the practical optical flow method based on feature matching is, for example, a dense algorithm. It should be noticed that, calculating the pixel movement velocities of the pixel points in the camera coordinate system by the optical flow method based on feature matching is just an embodiment of the present disclosure, which cannot be construed to limit the present disclosure. Other methods for calculating the pixel movement velocities of the pixel points in the camera coordinate system may also be applied in the present disclosure, which will fall in the scope of the present disclosure.

At block S3, an actual flying velocity of the UAV in a world coordinate system is obtained.

In practice, the actual flying velocity of the UAV in the world coordinate system may be calculated or measured by a velocity measurement device such as GNSS (global navigation satellite system) positioning velocity measurement (e.g. GPS (global position system), Beidou navigation satellite, etc.), an airspeed head, or a radar. Then the measured or calculated flying velocity of the UAV in the world coordinate system is obtained.

At block S4, a range image of each overlapped region is obtained according to the pixel movement velocity of each pixel point in the overlapped region in the camera coordinate system of the UAV, the actual flying velocity of the UAV in the word coordinate system, and parameters of the airborne camera. Then the range image of each overlapped region may be integrated to obtain a range image of the preset scene. In an embodiment of the present disclosure, the parameters of the airborne camera may include a focal length of the airborne camera.

In detail, since the airborne camera is installed on the self-stabilizing platform, it can be assumed that when the image is taken, the angular velocity of the airborne camera is always zero. In a circumstance that the angular velocity of the airborne camera is always zero or close to zero when each image is taken, the block S4 may further include followings.

At block S41, relationships are established among the pixel movement velocity of each pixel point in the overlapped region in the camera coordinate system of the UAV, the actual flying velocity of the UAV in the word coordinate system, and a flying height of the UAV. In detail, for example, the relationships among the pixel movement velocity of each pixel point in the overlapped region in the camera coordinate system of the UAV, the actual flying velocity of the UAV in the word coordinate system, and the flying height of the UAV may be established based on the principle of pin-hole imaging, and the relationships may be expressed as an equation of $$v_m = v \frac{Z}{f},$$

where, $v_m$ is the actual flying velocity of the UAV in the word coordinate system, v is the pixel movement velocity of each pixel point in the overlapped region in the camera coordinate system of the UAV, Z is the flying height of the UAV, and f is the focal length of the airborne camera.

At block S42, the equation of expressing the relationships mentioned in the block SD41 is transformed to obtain a depth value of each pixel point in the overlapped region by an equation of $$Z_i = \frac{v_i}{v_m} * \frac{1}{f} \quad (0 < i < \text{sum(pixels)}),$$

where, $Z_i$ is the depth value of the $i^{th}$ pixel point in the overlapped region, $v_i$ is the pixel movement velocity of the $i^{th}$ pixel point in the camera coordinate system, $v_m$ is the actual flying velocity of the UAV in the word coordinate system, and f is the focal length of the airborne camera which is a known constant.

At block S43, the range image of each overlapped region is obtained according to the depth value of each pixel point in each overlapped region obtained in the block S42, and the range image of each overlapped region may be integrated to obtain the range image of the preset scene (the object to be measured).

In an embodiment of the present disclosure, the above process may further includes determining whether an orientation of the camera coordinate system is in accordance with an orientation of the world coordinate system, and when the orientation of the camera coordinate system is not in accordance with the orientation of the world coordinate system, adjusting the orientation of the camera coordinate system to make the orientation of the camera coordinate system in accordance with the orientation of the world coordinate system.

In summary, the present disclosure calculates image depth data by combining the pixel movement velocity of each pixel point in the camera coordinate system of the UAV and the actual flying velocity of the UAV itself and obtains the range image accordingly. Thus any methods of using an image velocity (the pixel movement velocity of each pixel point in the camera coordinate system of the UAV) and the actual flying velocity of the UAV itself to obtain the range image will fall into the scope of the present disclosure.

In the related art, methods for obtaining the range image with a UAV usually include emitting an energy beam actively, detecting returned energy, and calculating the range image according to the detected energy. However, these methods are influenced susceptibly by surrounding environments, for example light may influence laser. In addition, these methods require that an object to be measured must be able to reflect the energy. When most of the emission energy is absorbed, it will lead to a failure. Moreover, a measurable range of these methods is limited because the emitted energy will be attenuated in the atmosphere. When a distance is too far, the attenuation will be so serious that the depth information cannot be measured accurately.

With the method for obtaining a range image with a UAV according to embodiments of the present disclosure, the image sequence is taken by the airborne camera of the UAV. For the overlapped region of two continuous images, the pixel movement velocity of each pixel point in the camera coordinate system of the UAV is obtained based on the position changing information of each pixel point. The actual flying velocity of the UAV in the word coordinate system is measured by devices such as an airborne GPS. Then the range image may be calculated according to the relationships among the pixel movement velocities of pixel points in the camera coordinate system of the UAV, the actual flying velocity of the UAV in the word coordinate system, and the flying height of the UAV. With the method, the range image can be accurately obtained. Moreover, there are no requirements on energy reflection for the object to be measured, so that a measurable distance is long enough.

Embodiments of the present disclosure also provide an apparatus for obtaining a range image with a UAV.

Figure 3:
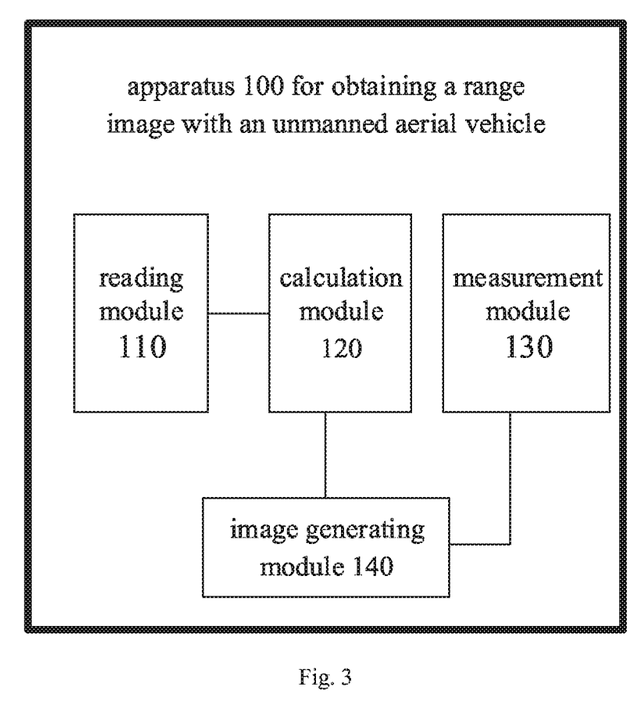
FIG. 3 is a block diagram illustrating an apparatus for obtaining a range image with a UAV according to an embodiment of the present disclosure.

FIG. 3 is a block diagram illustrating an apparatus for obtaining a range image with a UAV according to an embodiment of the present disclosure. As illustrated in FIG. 3, the apparatus 100 for obtaining a range image with a UAV includes a reading module 110, a calculation module 120, a measurement module 130 and an image generating module 140.

In detail, the reading module 110 is configured to read an image sequence of a predetermined scene collected by an airborne camera of a UAV, in which the $N^{th}$ image and the $(N+1)^{th}$ image of the image sequence have an overlapping region, and a ratio of an area of the overlapping region to an area of the $N^{th}$ image or a ratio of the area of the overlapping region to an area of the $(N+1)^{th}$ image is greater than a preset ratio. In other words, the image sequence of an object to be measured is taken by the airborne camera and two continuous images are extracted therefrom, for example, the $N^{th}$ image and the $(N+1)^{th}$ image. Besides, the $N^{th}$ image and the $(N+1)^{th}$ image must have the overlap region. To insure accuracy of a following optical flow calculation, the ratio of the area of the overlapping region to the area of the $N^{th}$ image or the $(N+1)^{th}$ image needs to be greater than the preset ratio. More particularly, in an embodiment of the present disclosure, for example, the preset ratio is 60%, that is, the area of the overlapping region accounts for more than 60% of the area of the $N^{th}$ image or the $(N+1)^{th}$ image.

In addition, in an embodiment of the present disclosure, to insure qualities of images taken by the airborne camera and to reduce disturbance to the following optical flow calculation that may be caused by airframe vibrations of the UAV, the airborne camera may be installed onto the UAV through a self-stabilizing platform, for example. Meanwhile, to reduce influence of distortion of the image itself taken by the airborne camera, a visual angle of the airborne camera cannot be too large. In an example of the present disclosure, the visual angle of the airborne camera is selected to be less than a preset angle. More particularly, for example, the preset angle may be 60 degree. Obviously, the preset angle is not limited to the above angle and may be selected according to requirements of an actual scene (for example, the preset angle may be less than 60 degree), and this embodiment is just illustrated as an example.

In an embodiment of the present disclosure, when the distortion of the image taken by the airborne camera is serious, the reading module 110 is further configured to adjust the distortion in the image sequence to make the distortion in a tolerable range for following operations.

The calculation module 120 is configured to obtain, for each pixel point in the overlapped region, position changing information of the pixel point in the $(N+1)^{th}$ image with respect to the $N^{th}$ image and to obtain a pixel movement velocity of each pixel point in the overlapped region in a camera coordinate system of the UAV according to the position changing information. In detail, for example, the calculation module 120 is configured to obtain the change of the position information (i.e. the position changing information) of each pixel point in the overlapped region in the $(N+1)^{th}$ image with respect to the $N^{th}$ image by an optical flow method based on feature matching, and to obtain the pixel movement velocity of each pixel point in the overlapped region in the camera coordinate system of the UAV according to the change of the position information.

In an embodiment of the present disclosure, the calculation module 120 is configured to calculate the moving distance of each pixel point in the overlapped region in the camera coordinate system of the UAV via the optical flow based on feature matching. This action may further include calculating moving information of a same pixel point based on position information of the same pixel point in the $N^{th}$ image and the $(N+1)^{th}$ image and obtaining a moving distance of the same pixel point in the camera coordinate system according to the moving information; finding a derivative of the moving distance of each pixel point in the overlapped region in the camera coordinate system of the UAV with respect to time to obtain the pixel movement velocity of each pixel point in the overlapped region in the camera coordinate system of the UAV.

As a particular example, the moving distance of each pixel point in the overlapped region in the camera coordinate system of the UAV may be calculated via an equation of $$(u_x, u_y) = (x_2 - x_1, y_2 - y_1),$$

where, $(x_1, y_1)$ represents the position information of the pixel point in the $N^{th}$ image, $(x_2, y_2)$ represents the position information of the pixel point in the $(N+1)^{th}$ image, and $(u_x, u_y)$ represents the moving distance of the pixel point in the camera coordinate system. With the optical flow method based on feature matching, a position in the $N^{th}$ image for each pixel point in the $N^{th}$ image is matched, then the moving distance of each pixel point in the $N^{th}$ image to the $(N+1)^{th}$ image may be calculated, and the pixel movement velocity of each pixel point in the camera coordinate system of the UAV may be obtained based on the moving distance. In detail, the optical flow method based on feature matching may include a dense algorithm and a sparse algorithm. With the dense algorithm, all pixel points in an image are participated in calculation, so as to obtain the pixel movement velocity of each pixel point in the image. While with the sparse algorithm, parts of pixel points in the image which are easy to track may be selected, and optical flow calculation is performed to the selected pixel points so as to obtain pixel movement velocities of these pixel points easy to track. In an embodiment of the present disclosure, the practical optical flow method based on feature matching may be a dense algorithm. It should be noticed that, calculating the pixel movement velocities of the pixel points in the camera coordinate system by the optical flow method based on feature matching is just an embodiment of the present disclosure, which cannot be construed to limit the present disclosure. Other methods for calculating the pixel movement velocities of the pixel points in the camera coordinate system may also be applied in the present disclosure, which will fall in the scope of the present disclosure.

The measurement module 130 is configured to obtain an actual flying velocity of the UAV in a world coordinate system. In practice, the actual flying velocity of the UAV in the world coordinate system may be obtained by GPS, Beidou (big dipper) navigation satellite, an airspeed head or a radar.

The image generating module 140 is configured to obtain a range image of each overlapped region according to the pixel movement velocity of each pixel point in the overlapped region in the camera coordinate system of the UAV, the actual flying velocity of the UAV in the word coordinate system, and parameters of the airborne camera and to obtain a range image of the preset scene through integrating the range image of each overlapped region. In an embodiment of the present disclosure, the parameters of the airborne camera may include a focal length of the airborne camera.

In detail, since the airborne camera is installed on the self-stabilizing platform, it can be assumed that when the image is taken, the angular velocity of the airborne camera is always zero. In an embodiment of the present disclosure, the image generating module 140 is configured to establish relationships among the pixel movement velocity of each pixel point in the overlapped region in the camera coordinate system of the UAV, the actual flying velocity of the UAV in the word coordinate system, and a flying height of the UAV. In detail, the image generating module 140 may be configured to establish the relationships among the pixel movement velocity of each pixel point in the overlapped region in the camera coordinate system of the UAV, the actual flying velocity of the UAV in the word coordinate system, and a flying height of the UAV based on the principle of pin-hole imaging. The relationships may be expressed as an equation of:

$$v_m = v \frac{Z}{f},$$

where, $v_m$ is the actual flying velocity of the UAV in the word coordinate system, v is the pixel movement velocity of each pixel point in the overlapped region in the camera coordinate system of the UAV, Z is the flying height of the UAV, and f is the focal length of the airborne camera.

Then a depth value of each pixel point in the overlapped region is obtained based on the above relationships as follows:

$$Z_i = \frac{v_i}{v_m} * \frac{1}{f} \quad (0 < i < \text{sum(pixels)}),$$

where, $Z_i$ is the depth value of the $i^{th}$ pixel point in the overlapped region, $v_i$ is the pixel movement velocity of the $i^{th}$ pixel point in the camera coordinate system, $v_m$ is the actual flying velocity of the UAV in the word coordinate system, and f is the focal length of the airborne camera which is a known constant.

At last, the range image of each overlapped region is obtained according to the depth value of each pixel point in each overlapped region, and the range image of each overlapped region may be integrated to obtain the range image of the preset scene (the object to be measured).

In an embodiment of the present disclosure, the apparatus 100 for obtaining a range image with a UAV further includes, for example, an adjusting module (not illustrated in the figures). The adjusting module is configured to determine whether an orientation of the camera coordinate system is in accordance with an orientation of the world coordinate system, and to adjust the orientation of the camera coordinate system to make the orientation of the camera coordinate system in accordance with the orientation of the world coordinate system when the orientation of the camera coordinate system is not in accordance with the orientation of the world coordinate system.

In summary, the present disclosure calculates image depth data by combining the pixel movement velocity of each pixel point in the camera coordinate system of the UAV and the actual flying velocity of the UAV itself and obtains the range image accordingly. Thus any methods of using an image velocity (the pixel movement velocity of each pixel point in the camera coordinate system of the UAV) and the actual flying velocity of the UAV itself to obtain the range image will fall into the scope of the present disclosure.

With the apparatus for obtaining a range image with a UAV according to embodiments of the present disclosure, the image sequence captured by the airborne camera of the UAV is read by the reading module. For the overlapped region of two continuous images, the pixel movement velocity of each pixel point in the camera coordinate system of the UAV is obtained based on the position changing information of each pixel point by the calculation module. The actual flying velocity of the UAV in the word coordinate system is measured by the measurement module, for example devices such as an airborne GPS. Then the range image may be calculated according to the relationships among the pixel movement velocities of pixel points in the camera coordinate system of the UAV, the actual flying velocity of the UAV in the word coordinate system, and the flying height of the UAV by the image generating module. With the apparatus, the range image can be accurately obtained. Moreover, there are no requirements on energy reflection for the object to be measured, so that a measurable distance is long enough.

Embodiments of the present disclosure also provide a UAV. The UAV includes an airborne camera, a velocity measurement device, a processor, and an airframe. The airborne camera and the velocity measurement device are coupled to the processor respectively. The airframe is configured for the airborne camera, the velocity measurement device and the processor to be installed onto. The airborne camera is configured to collect an image sequence of a preset scene. The velocity measurement device is configured to measure or calculate an actual flying velocity of the UAV in the world coordinate system. In practice, the velocity measurement device may include a GNSS (global navigation satellite system) positioning velocity measurement (e.g. GPS (global position system), Beidou navigation satellite, etc.), an airspeed head or a radar.

The processor is configured to perform the above method for obtaining a range image with a UAV. In other words, the processor includes the apparatus for obtaining a range image with a UAV described in above embodiments of the present disclosure.

In an embodiment of the present disclosure, the UAV further includes a self-stabilizing platform, and the airborne camera may be installed onto the airframe through the self-stabilizing platform.

With the UAV according to embodiments of the present disclosure, the airborne camera, the velocity measurement device and the processor are installed on the airframe. The image sequence is taken by the airborne camera and read by the processor. For the overlapped region of two continuous images, the pixel movement velocity of each pixel point in the camera coordinate system of the UAV is obtained based on the position changing information of each pixel point. The actual flying velocity of the UAV in the word coordinate system is measured by a device such as an airborne GPS. Then the range image may be calculated according to the relationships among the pixel movement velocities of pixel points in the camera coordinate system of the UAV, the actual flying velocity of the UAV in the word coordinate system, and the flying height of the UAV. Therefore, the range image can be accurately obtained. Moreover, there are no requirements on energy reflection for the object to be measured, so that a measurable distance is long enough.

The serial numbers of embodiments in the present disclosure are just for description and do not imply that the corresponding embodiment is preferable or advantageous.

In above embodiments of the present disclosure, particular emphasis may be put on different parts, and details of parts that are not described in some embodiments may be found in other embodiments.

It should be understood that, the technical contents disclosed in the embodiments of the present disclosure can also be achieved in other manners. The above-described apparatus embodiments are merely for the purpose of illustration. For example, the partition of modules may be logical and functional, and can be achieved in different ways of partition. For example, a plurality of modules of assemblies can be combined or integrated into another system, or some features may be neglected or not be executed. In addition, the illustrated or discussed terms "coupled", "directly coupled", or "communication connection" there-between may be indirectly coupled or communication connection through some interfaces, units or modules, and can be electrically or in other forms.

Those units described as separated components or modules may be or may not be physically separated; those units described as a display component may be or may not be a physical unit, i.e., either located at one place or distributed onto a plurality of network units. The object of the present disclosure may be achieved by part or all of modules in accordance with practical requirements.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module.

When the integrated module is achieved in the form of a software functional module and sold or used as a separate product, the integrated module may also be stored in a computer readable storage medium. Based on this understanding, the substance of technical solutions of the present disclosure or in other words the parts which contributes to the prior art or all or part of the solution may be achieved or expressed in a software product. The software product may be stored in a computer-readable storage medium which includes instructions for a computer device (personal computer, server or network device) to perform all or part of the steps in the methods described in embodiments of the present disclosure. The computer readable storage medium may include a flash disk, a read-only memory (ROM), a random access memory (RAM), a mobile hard disc, a magnetic disc, an optical disc, or any medium that can store program codes.

Although explanatory embodiments have been shown and described, it would be appreciated by those skilled in the art that changes, alternatives, and modifications can be made in the embodiments without departing from spirit, principles and scope of the present disclosure, and thus fall in the scope of the present disclosure.

What is claimed is:

1. A method for obtaining a range image with an unmanned aerial vehicle UAV, comprising the following acts performed by the UAV:

flying the UAV;

collecting an image sequence of a predetermined scene by an airborne camera of the UAV during the flying, such that the $N^{th}$ image and the $(N+1)^{th}$ image of the image sequence have an overlapping region, and a ratio of an area of the overlapping region to an area of the $N^{th}$ image or a ratio of the area of the overlapping region to an area of the $(N+1)^{th}$ image is greater than a preset ratio;

for each pixel point in the overlapped region, obtaining position changing information of the pixel point in the $(N+1)^{th}$ image with respect to the $N^{th}$ image and obtaining a pixel movement velocity of each pixel point in the overlapped region in a camera coordinate system of the UAV according to the position changing information;

obtaining an actual flying velocity of the UAV in a world coordinate system, using a velocity measuring device while flying the UAV; and generating a range image of each overlapped region according to the pixel movement velocity of each pixel point in the overlapped region in the camera coordinate system of the UAV, the actual flying velocity of the UAV in the word coordinate system and parameters of the airborne camera, and generating a range image of the preset scene through integrating the range image of each overlapped region.

2. The method according to claim 1, wherein, for each pixel point in the overlapped region, obtaining position changing information of the pixel point in the $(N+1)^{th}$ image with respect to the $N^{th}$ image and obtaining a pixel movement velocity of each pixel point in the overlapped region in a camera coordinate system of the UAV according to the position changing information comprises:

calculating a moving distance of each pixel point in the overlapped region in the camera coordinate system of the UAV;

finding a derivative of the moving distance of each pixel point in the overlapped region in the camera coordinate system of the UAV with respect to time to obtain the pixel movement velocity of each pixel point in the overlapped region in the camera coordinate system of the UAV.

3. The method according to claim 2, wherein, calculating a moving distance of each pixel point in the overlapped region in the camera coordinate system of the UAV comprises:

calculating moving information of a same pixel point based on position information of the same pixel point in the $N^{th}$ image and the $(N+1)^{th}$ image and obtaining a moving distance of the same pixel point in the camera coordinate system according to the moving information.

4. The method according to claim 1, wherein, generating the range image of each overlapped region according to the pixel movement velocity of each pixel point in the overlapped region in the camera coordinate system of the UAV, the actual flying velocity of the UAV in the word coordinate system, and parameters of the airborne camera, and generating the range image of the preset scene through integrating the range image of each overlapped region comprises:

establishing relationships among the pixel movement velocity of each pixel point in the overlapped region in the camera coordinate system of the UAV, the actual flying velocity of the UAV in the word coordinate system, and a flying height of the UAV;

obtaining a depth value of each pixel point in the overlapped region based on the relationships;

generating the range image of each overlapped region according to the depth value of each pixel point in each overlapped region, and integrating the range image of each overlapped region to obtain the range image of the preset scene.

5. The method according to claim 4, further comprising:

determining whether an orientation of the camera coordinate system is in accordance with an orientation of the world coordinate system;

when the orientation of the camera coordinate system is not in accordance with the orientation of the world coordinate system, adjusting the orientation of the camera coordinate system so as to make the orientation of the camera coordinate system in accordance with the orientation of the world coordinate system.

6. The method according to claim 1, wherein, a visual angle of the airborne camera is less than a preset angle, and the preset angle is equal to or less than 60 degree.

7. The method according to claim 1, wherein, before obtaining position changing information of the pixel point in the $(N+1)^{th}$ image with respect to the $N^{th}$ image for each pixel point in the overlapped region, further comprising:

adjusting distortion of images in the image sequence.

8. An apparatus for obtaining a range image with an unmanned aerial vehicle UAV, comprising:

a processor;

a non-transitory computer-readable medium storing instructions, which when executed by the processor configure the apparatus to:

collect an image sequence of a predetermined scene collected by an airborne camera of the UAV during flying of the UAV, such that the $N^{th}$ image and the $(N+1)^{th}$ image of the image sequence have an overlapping region, and a ratio of an area of the overlapping region to an area of the $N^{th}$ image or a ratio of the area of the overlapping region to an area of the $(N+1)^{th}$ image is greater than a preset ratio;

obtain, for each pixel point in the overlapped region, position changing information of the pixel point in the $(N+1)^{th}$ image with respect to the $N^{th}$ image and to obtain a pixel movement velocity of each pixel point in the overlapped region in a camera coordinate system of the UAV according to the position changing information;

obtain an actual flying velocity of the UAV in a world coordinate system, using a velocity measuring device during flying of the UAV; and generating a range image of each overlapped region according to the pixel movement velocity of each pixel point in the overlapped region in the camera coordinate system of the UAV, the actual flying velocity of the UAV in the word coordinate system, and parameters of the airborne camera and to generate a range image of the preset scene through integrating the range image of each overlapped region.

9. The apparatus according to claim 8, wherein, the instructions further configure the processor to:

calculate a moving distance of each pixel point in the overlapped region in the camera coordinate system of the UAV; and find a derivative of the moving distance of each pixel point in the overlapped region in the camera coordinate system of the UAV with respect to time to obtain the pixel movement velocity of each pixel point in the overlapped region in the camera coordinate system of the UAV.

10. The apparatus according to claim 9, wherein, the instructions further configure the processor to:

calculate moving information of a same pixel point based on position information of the same pixel point in the $N^{th}$ image and the $(N+1)^{th}$ image and obtain moving distance of the pixel point in the camera coordinate system according to the moving information.

11. The apparatus according to claim 8, wherein, the instructions further configure the processor to:

establish relationships among the pixel movement velocity of each pixel point in the overlapped region in the camera coordinate system of the UAV, the actual flying velocity of the UAV in the word coordinate system, and a flying height of the UAV;

obtain a depth value of each pixel point in the overlapped region based on the relationships;

generate the range image of each overlapped region according to the depth value of each pixel point in each overlapped region, and integrate the range image of each overlapped region to obtain the range image of the preset scene.

12. The apparatus according to claim 11, wherein the instructions further configure the processor to:

determine whether an orientation of the camera coordinate system is in accordance with an orientation of the world coordinate system, and to adjust the orientation of the camera coordinate system to make the orientation of the camera coordinate system in accordance with the orientation of the world coordinate system when the orientation of the camera coordinate system is not in accordance with the orientation of the world coordinate system.

13. The apparatus according to claim 8, wherein, a visual angle of the airborne camera is less than a preset angle, and the preset angle is equal to or less than 60 degree.

14. The apparatus according to claim 8, wherein, the airborne camera is further configured to adjust distortion of images in the image sequence.

15. An unmanned aerial vehicle UAV, comprising:

an airborne camera, configured to collect an image sequence of a preset scene;

a velocity measurement device, configured to measure or calculate an actual flying velocity of the UAV in a world coordinate system;

a processor, configured to perform a method for obtaining a range image with an unmanned aerial vehicle UAV;

an airframe, configured to install the airborne camera, the velocity measurement device and the processor, wherein the method comprises:

reading an image sequence of a predetermined scene collected by an airborne camera of the UAV, wherein the $N^{th}$ image and the $(N+1)^{th}$ image of the image sequence have an overlapping region, and a ratio of an area of the overlapping region to an area of the $N^{th}$ image or a ratio of the area of the overlapping region to an area of the $(N+1)^{th}$ image is greater than a preset ratio;

for each pixel point in the overlapped region, obtaining position changing information of the pixel point in the $(N+1)^{th}$ image with respect to the $N^{th}$ image and obtaining a pixel movement velocity of each pixel point in the overlapped region in a camera coordinate system of the UAV according to the position changing information;

obtaining an actual flying velocity of the UAV in a world coordinate system;

obtaining a range image of each overlapped region according to the pixel movement velocity of each pixel point in the overlapped region in the camera coordinate system of the UAV, the actual flying velocity of the UAV in the word coordinate system and parameters of the airborne camera, and obtaining a range image of the preset scene through integrating the range image of each overlapped region.

16. The unmanned aerial vehicle according to claim 15, further comprising a self-stabilizing platform, wherein the airborne camera is installed onto the airframe through the self-stabilizing platform.

17. The unmanned aerial vehicle according to claim 15, wherein, for each pixel point in the overlapped region, obtaining position changing information of the pixel point in the $(N+1)^{th}$ image with respect to the $N^{th}$ image and obtaining a pixel movement velocity of each pixel point in the overlapped region in a camera coordinate system of the UAV according to the position changing information comprises:

calculating a moving distance of each pixel point in the overlapped region in the camera coordinate system of the UAV;

finding a derivative of the moving distance of each pixel point in the overlapped region in the camera coordinate system of the UAV with respect to time to obtain the pixel movement velocity of each pixel point in the overlapped region in the camera coordinate system of the UAV.

18. The unmanned aerial vehicle according to claim 17, wherein, calculating a moving distance of each pixel point in the overlapped region in the camera coordinate system of the UAV comprises:

calculating moving information of a same pixel point based on position information of the same pixel point in the $N^{th}$ image and the $(N+1)^{th}$ image and obtaining a moving distance of the same pixel point in the camera coordinate system according to the moving information.

19. The unmanned aerial vehicle according to claim 15, wherein, obtaining the range image of each overlapped region according to the pixel movement velocity of each pixel point in the overlapped region in the camera coordinate system of the UAV, the actual flying velocity of the UAV in the word coordinate system, and parameters of the airborne camera, and obtaining the range image of the preset scene through integrating the range image of each overlapped region comprises:

establishing relationships among the pixel movement velocity of each pixel point in the overlapped region in the camera coordinate system of the UAV, the actual flying velocity of the UAV in the word coordinate system, and a flying height of the UAV;

obtaining a depth value of each pixel point in the overlapped region based on the relationships;

obtaining the range image of each overlapped region according to the depth value of each pixel point in each overlapped region, and integrating the range image of each overlapped region to obtain the range image of the preset scene.

20. The unmanned aerial vehicle according to claim 19, wherein the method further comprises:

determining whether an orientation of the camera coordinate system is in accordance with an orientation of the world coordinate system;

when the orientation of the camera coordinate system is not in accordance with the orientation of the world coordinate system, adjusting the orientation of the camera coordinate system so as to make the orientation of the camera coordinate system in accordance with the orientation of the world coordinate system.

\* \* \* \* \*